July 18, 1939.  B. M. BROWNELL  2,166,232
PIPE CONNECTOR
Filed April 13, 1938
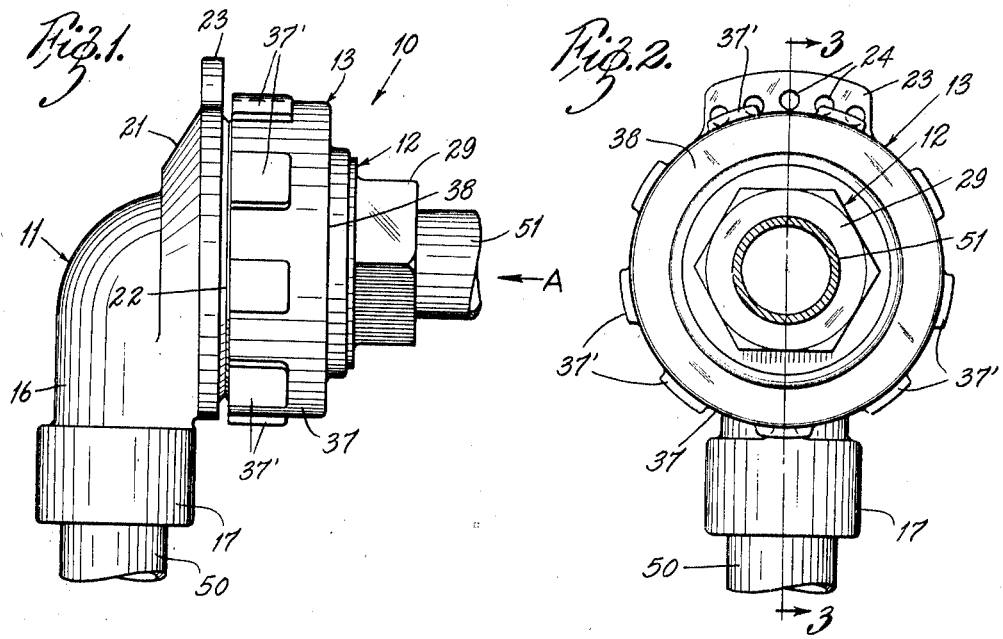
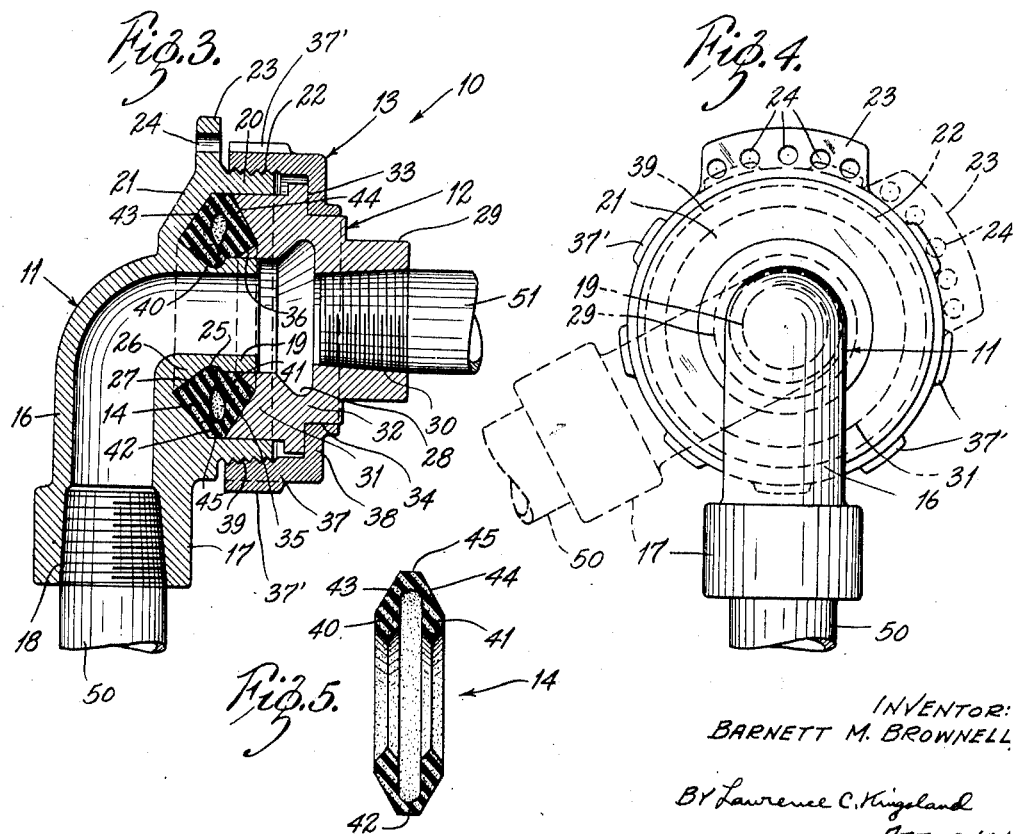
INVENTOR:
BARNETT M. BROWNELL
BY Lawrence C. Kingsland
ATTORNEY.

Patented July 18, 1939

2,166,232

UNITED STATES PATENT OFFICE 2,166,232

PIPE CONNECTOR

Barnett Morse Brownell, University City, Mo.

Application April 13, 1938, Serial No. 201,711

3 Claims. (Cl. 285—163)

The present invention relates generally to pipe connectors, and more particularly to a novel construction for effecting a tight non-obstructing seal for a pipe connector.

An object of the present invention is to provide a pipe connector which includes a novel construction for effectively sealing the same and for maintaining a sealing means in place relative to its seat in disassembly of the connector.

Another object is to provide a pipe connector which is adapted to insure long life of the packing and in which the passageway for the fluid cannot become obstructed through the forcing of portions of the packing thereinto.

Another object is to provide a pipe connector which includes telescoping elements for the passage of fluid from one pipe to a second pipe.

Another object is to provide a pipe connector which includes telescoping elements and a sealing construction for preventing leakage.

Another object is to provide a pipe connector which is sturdy and compact in construction and which is adapted to fulfill its functions over a long period of time.

Another object is to provide a pipe connector including means to maintain a packing member in place when the connector is taken apart.

Other objects and advantages will be apparent from the following description, taken in conjunction with the accompanying drawing, in which:

Fig. 1 is a side view of a pipe connector constructed in accordance with the teachings of the present invention;

Fig. 2 is an end view of the pipe connector shown in Fig. 1, looking in the direction of the arrow A;

Fig. 3 is a section on the line 3—3 of Fig. 2;

Fig. 4 is a view of the other end of the pipe connector shown in Fig. 1; and,

Fig. 5 is a sectional view taken on a diameter of a preferred packing member.

Referring to the drawing more particularly by reference numerals, there is disclosed a pipe connector 10. The pipe connector 10 includes a main telescoping member or body 11, a secondary telescoping member 12, an assembly ring 13, and a packing member or sealing ring 14.

The main telescoping member 11 includes a right angularly bent pipe section 16 which terminates at one end in a pipe receiving enlargement 17 having internally disposed spiral threads 18. Concentrically disposed about the other end 19 of the pipe section 16 is an annular wall 20 which is connected to the pipe section 16 by a conical flange 21, thereby forming a circular trough. The wall 20 extends slightly beyond the extremity of the end 19 and has external threads 22. An elongated projection 23 having spaced apertures 24 therethrough extends outwardly from the wall 20. The flange 21 merges into the wall of the pipe section 16 at the juncture as a matter of convenience in construction, as can be appreciated from an inspection of Figs. 1 and 3. The end 19 of the pipe section 16 has an external peripheral groove 25 and is circumferentially thickened at 26 to provide the conical surface 27.

The secondary telescoping member 12 is preferably of the central cross section shown in Fig. 3, being in the form of an elongated irregular sleeve. The member 12 includes a pipe receiving section 29 which has internal spiral threads 30. A cylindrical section 31 is connected to the pipe receiving section 29 by an intermediate section 32, the intermediate section 32 including an internal annular groove 28, a plane annular surface 33, and a cylindrical surface 34. The cylindrical section 31 terminates at its free end in right angularly intersecting cone surfaces 35 and 36.

The assembly ring 13 includes a cylindrical section 37 and a flange 38. The cylindrical section 37 has internal threads 39 and spaced external bosses 37′.

The packing member 14 is an annulus, preferably of resilient material, and is of the cross section and general configuration shown in Fig. 5. The member 14 includes two annular legs 40 and 41 connected by the annular portion 42. The annular legs 40 and 41 include, respectively, a conical surface 43 and a conical surface 44 which are adapted to rest against the internal conical surface of the flange 21 and the conical surface 35 of the secondary telescoping member 12, respectively, and the portion 42 has a cylindrical surface 45 which is adapted to engage the inner cylindrical surface of the wall 20. The configuration of the packing member 14 is such that it fits within the trough formed by the end 19 of the pipe section 16, the flange 21, and the wall 20, and is adapted to be so held by the groove 25.

Pipe sections 50 and 51 are shown screwed into the enlargement 17 and the pipe receiving section 29, respectively.

The several elements comprising the pipe connector 10 are constructed of suitable material.

Operation

The assembly of the pipe connector 10 can be readily grasped by a study of the drawing. The packing member 14 is disposed between the wall 20 and the end 19 of the pipe section 16 with the leg 40 hooked in the groove 25. The secondary telescoping member 12 is telescoped relative to the main telescoping member 11 with the free extremity of the cylindrical section 31 of the former engaging the packing member 14. The assembly ring 13 is disposed about the secondary telescoping member 12 and is threaded onto the wall 20 of the main telescoping member 11 with the flange 38 engaging the plane annular surface 33 until the packing member 14 is tightly compressed. The ring 13 is locked in position by any type of key inserted through one of the openings 24 and disposed between two of the bosses 37'.

When the pipe connector 10 is dismantled and the member 12 withdrawn from the member 11 the packing 14 remains in place due to its configuration and the groove 25. This is advantageous, since the likelihood of its loss, or the failure on the part of a worker to reinsert it, is thereby obviated in those instances where the connector 10 is dismantled for repair work other than the replacement per se of the packing 14.

When the packing member 14 is compressed and subjected to the heat of steam, or the like, passing through the connector 10 it assumes the cross section shown in Fig. 3, exhibiting an inherent characteristic of the material of which it is preferably constructed. The telescoping of the members 11 and 12 is highly advantageous. It is impossible to pinch the packing 14 or to squeeze it into the passageway of the fluid. The instant construction, of course, results in a longer life for the packing 14 and a continued unobstructed passageway for the fluid.

It is, of course, to be understood that where the pipe connector 10 is employed to operatively associate two already located pipes the members 11 and 12 are threadedly disposed upon the respective pipe sections before final assembly. This, of course, involves only a matter of pipe connecting routine.

It is clear that the pipe connector 10 is of a construction to obtain all of the objects and advantages sought therefor. It is to be understood that the foregoing description and accompanying drawing have been given by way of illustration and example and not for purposes of limitation, the invention being limited only by the claims which follow.

What is claimed is:

1. A pipe connector comprising a first member having a circular trough, a second member extending into said trough and thereby telescopically engaging said first member, a packing member in said trough between the extremity of the second member and the bottom of the trough, means for maintaining said packing member in associated relationship with said first member, and means maintaining said member telescopically engaged and said packing member compressed to seal the joint between the said members.

2. A pipe connector comprising a first member having a circular trough, a second member extending into said trough and thereby telescopically engaging said first member, an annular groove in the inner wall of said circular trough, a packing member in said trough between said second member and the bottom of the trough, said packing member including a portion extending into said groove to maintain it in position relative to said first member, and means maintaining said first and second members and said packing member in operative disposition.

3. A pipe connector comprising a first member having a circular trough, an annular groove in one wall of said trough, a packing member in said trough having a portion conformed to the bottom of the trough and to the groove and to a portion of the other wall, whereby the same is retained within said first member after installation, said packing member further having a portion spaced from the conformed portion and adapted to be compressed thereagainst, a second member having a circular portion extending into said trough and compressing said packing to seal the juncture, and means maintaining said second member in its sealing disposition relative to said first member and said packing member.

BARNETT MORSE BROWNELL.